United States Patent
Bemmer et al.

(10) Patent No.: US 7,116,653 B1
(45) Date of Patent: Oct. 3, 2006

(54) METHOD FOR ADAPTING THE MODE OF OPERATION OF A MULTI-MODE CODE TO THE CHANGING CONDITIONS OF RADIO TRANSFER IN A CDMA MOBILE RADIO NETWORK

(75) Inventors: Rene Bemmer, Bonn (DE); Zhongrong Liu, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/936,273

(22) PCT Filed: Mar. 13, 2000

(86) PCT No.: PCT/DE00/00751

§ 371 (c)(1),
(2), (4) Date: Nov. 9, 2001

(87) PCT Pub. No.: WO00/56001

PCT Pub. Date: Sep. 21, 2000

(30) Foreign Application Priority Data

Mar. 12, 1999 (DE) ................................. 199 11 179

(51) Int. Cl.
*H04B 7/216* (2006.01)
*H04J 3/16* (2006.01)

(52) U.S. Cl. ...................... 370/335; 370/342; 370/441; 370/465

(58) Field of Classification Search ............... 370/252, 370/468, 335, 342, 277, 278, 441, 465, 437, 370/236, 254, 255; 455/516, 517

See application file for complete search history.

(56) References Cited

U.S. PATENT DOCUMENTS

| | | | |
|---|---|---|---|
| 5,490,136 A | 2/1996 | Sereno et al. | |
| 5,537,410 A | 7/1996 | Li | |
| 5,577,087 A * | 11/1996 | Furuya | 375/377 |
| 5,673,266 A * | 9/1997 | Li | 370/465 |
| 5,701,294 A * | 12/1997 | Ward et al. | 370/252 |
| 5,751,903 A | 5/1998 | Swaminathan et al. | |
| 5,757,813 A * | 5/1998 | Raith | 714/708 |
| 5,845,215 A | 12/1998 | Henry et al. | 455/553 |
| 5,920,552 A * | 7/1999 | Allpress et al. | 370/335 |

(Continued)

FOREIGN PATENT DOCUMENTS

EP 0 627 827 12/1994

OTHER PUBLICATIONS

Kleider, J.E. et al., "An Adaptive-Rate Anti-Jam System for Optimal Voice Communication", Proceedings of MILCOM, IEEE, Nov. 1997, pp. 1103-1107.

(Continued)

*Primary Examiner*—Hassan Kizou
*Assistant Examiner*—Brian Roberts
(74) *Attorney, Agent, or Firm*—Baker & Daniels

(57) ABSTRACT

The invention concerns a procedure to adapt the operating mode of a multi-mode codec to the changing transmission conditions in a CDMA mobile transmission network. The object consists of the coordination of the adaption of the codec operating modes in both transmission interfaces involved.

Figure 1:
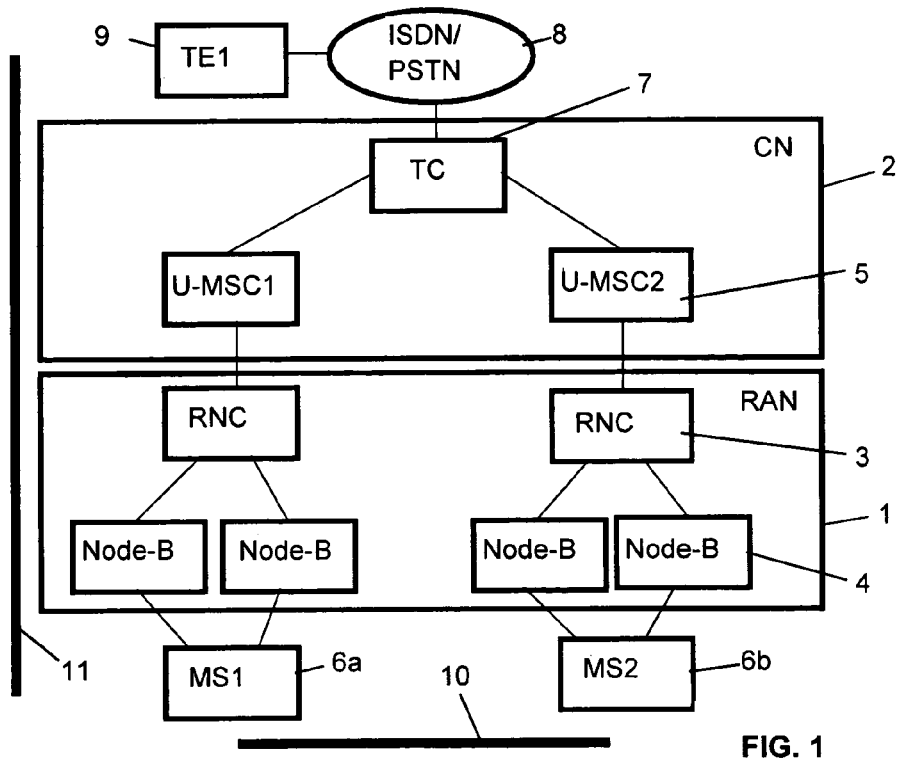

This is achieved by a constant polling regarding the quality of transmission on the transmission segments during a communication connection, where a change in transmission quality for any unit involved in the transmission initiates a change of codec operating modes and where the present or future change in codec operating mode is passed to the other units involved in the transmission.

13 Claims, 3 Drawing Sheets

U.S. PATENT DOCUMENTS

| | | | |
|---|---|---|---|
| 6,044,072 A * | 3/2000 | Ueda | 370/335 |
| 6,108,560 A * | 8/2000 | Navaro et al. | 455/517 |
| 6,134,220 A * | 10/2000 | Le Strat et al. | 370/252 |
| 6,167,060 A * | 12/2000 | Vargo et al. | 370/468 |
| 6,233,222 B1 * | 5/2001 | Wallentin | 370/229 |
| 6,256,487 B1 * | 7/2001 | Bruhn | 455/352 |
| 6,282,174 B1 * | 8/2001 | Abe | 370/252 |
| 6,452,941 B1 * | 9/2002 | Bruhn | 370/468 |
| 6,456,598 B1 * | 9/2002 | Le Strat et al. | 370/252 |
| 6,507,567 B1 * | 1/2003 | Willars | 370/321 |
| 6,646,995 B1 * | 11/2003 | Le Strat et al. | 370/252 |

OTHER PUBLICATIONS

Office Action dated Nov. 8, 1999 in German Application No. 199 11 179.0 and International Search Report dated Jul. 24, 2000 in PCT/DE00/00751.

* cited by examiner

METHOD FOR ADAPTING THE MODE OF OPERATION OF A MULTI-MODE CODE TO THE CHANGING CONDITIONS OF RADIO TRANSFER IN A CDMA MOBILE RADIO NETWORK

The invention concerns a method for adapting the mode of operation of a multi-mode codec to the changing conditions of radio transmission in a CDMA mobile radio network.

Mobile radio networks code voice signals differently than public switching telephone networks. Voice coding, such as that in use between the mobile station (MS) and the Radio Access Network (RAN), takes into account—in distinction from voice coding in public switching telephone networks—particularly the propagation properties of the radio link. For conversations between mobile stations in the same mobile network, a conversion to different voice coding (transcoding) is not absolutely required, whereas this is required for conversations between users of a mobile station and a telephone in a public switching telephone network. Conversations between mobile stations without conversion to different voice coding are termed transcoder-free.

The propagation conditions of a radio transmission segment vary continuously. This derives from modifications of the propagation conditions on the one hand and from interference on the other hand. Both the propagation conditions and interference can vary quickly in the course of an existing transmission. Users within the same network or in other radio systems are responsible for interference. Depending on the propagation conditions at hand, modifications to the source code may be required.

The following methods may be used in a CDMA system to maintain as much as possible of the quality of the connection under varying conditions in the radio transmission segment:

Adaption of the gross bit rate
Adaption of the transmission power
Adaption of the codec operation method: i.e. change to a more robust codec operation method in worsening transmission conditions.

A more robust codec operation method is understood as a reduced net bit rate (bit rate of voice coding) and thus increased channel coding. Codec is understood to be a function where voice signals are coded for transmission by the transmitter and the received voice signals are decoded by the receiver.

The described methods are used in combination.

Previously, the adaption was done separately for each transmission interface. For a transmission from a mobile station to a mobile station, the coding of the voice signal was adjusted by each transmission interface independently of each other. The voice signal was always transcoded for transfer into the fixed wire network. This double conversion provides for independence of the adaption in the transmission interfaces involved.

It is the intent of the present invention to specify a method for the adaption of the mode of operation of a multi-mode codec to changing transmission conditions in a CDMA mobile transmission network, which automatically adapts the codec operation method during a communication connection and thus allows for the most efficient transmission of voice signals in the mobile transmission network and between the mobile transmission network and the public switching telephone network.

This task is solved by the characteristics of the independent patent claim.

The invention is based on the coordination between both transmission interfaces involved in a connection. The core of the invention is the specification of a method, which describes how this coordination may be handled during a live communication connection and how the present or future adjustment is transmitted between the two units involved.

This achieves an automatic optimization of the codec mode to the current transmission conditions in the radio transmission segment between mobile stations and base stations in an efficient way. This will raise the interference resistance and transmission quality in the mobile network markedly and will contribute to optimal use of network resources, such as economy of frequency use, needed transmission power etc.

Advantageous further developments and embodiments of the invention are listed in the subservient patent claims.

The invention will be described more fully in the following by a sample embodiment with reference to several drawings. Additional characteristics and advantages of the invention can be derived from the drawings and their descriptions.

Figure 2:
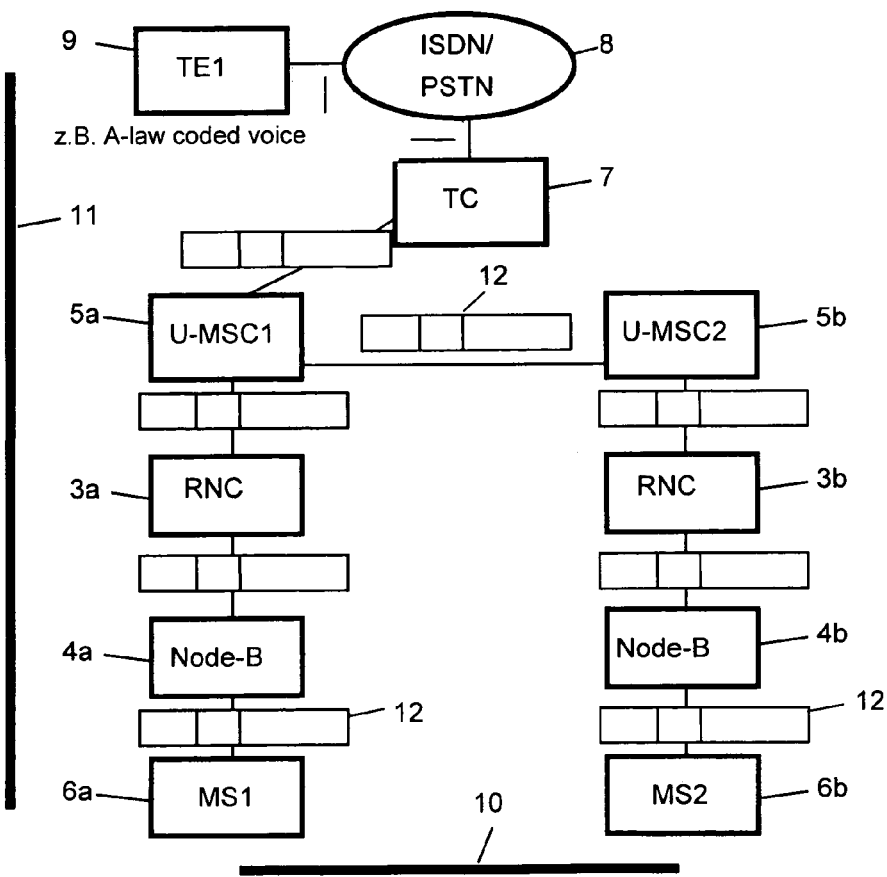
Figure 3:
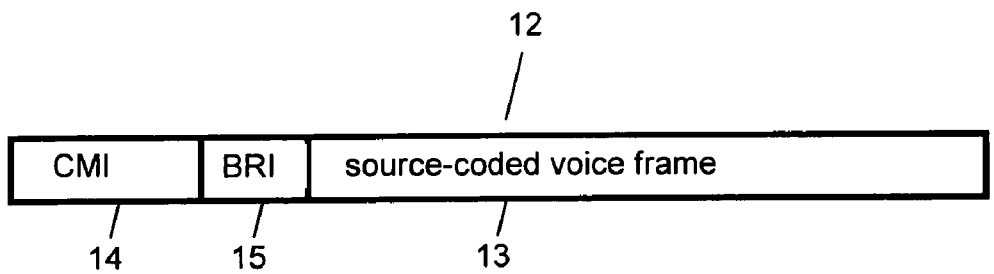
Figure 4:
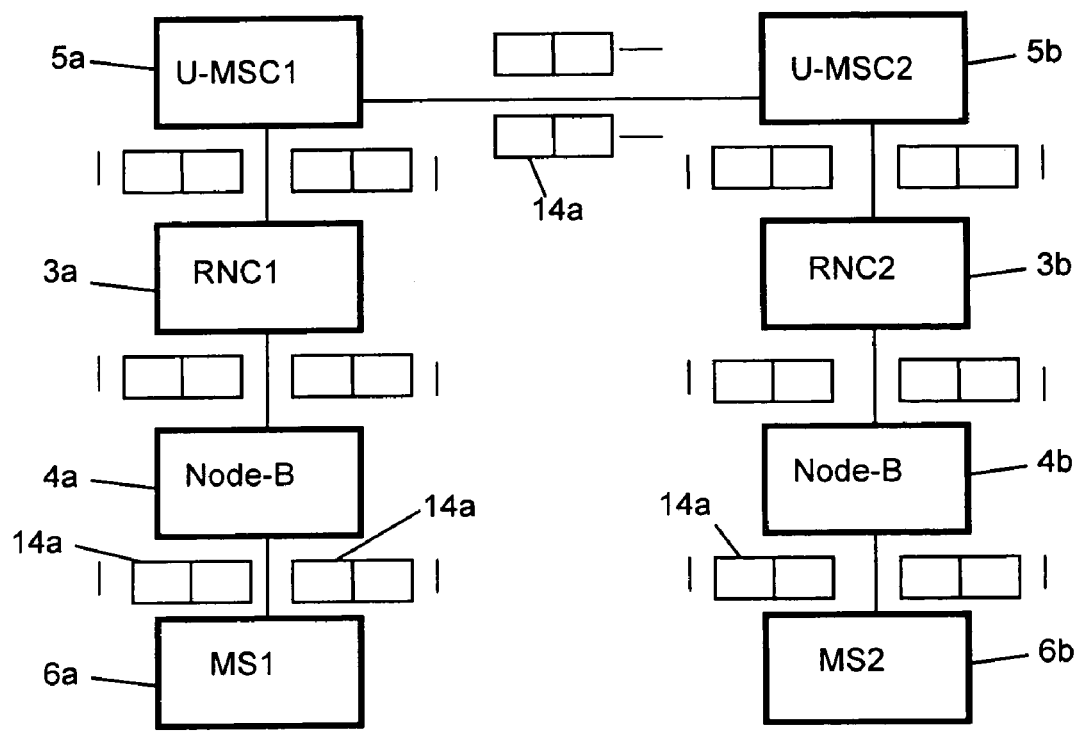
Figure 5:
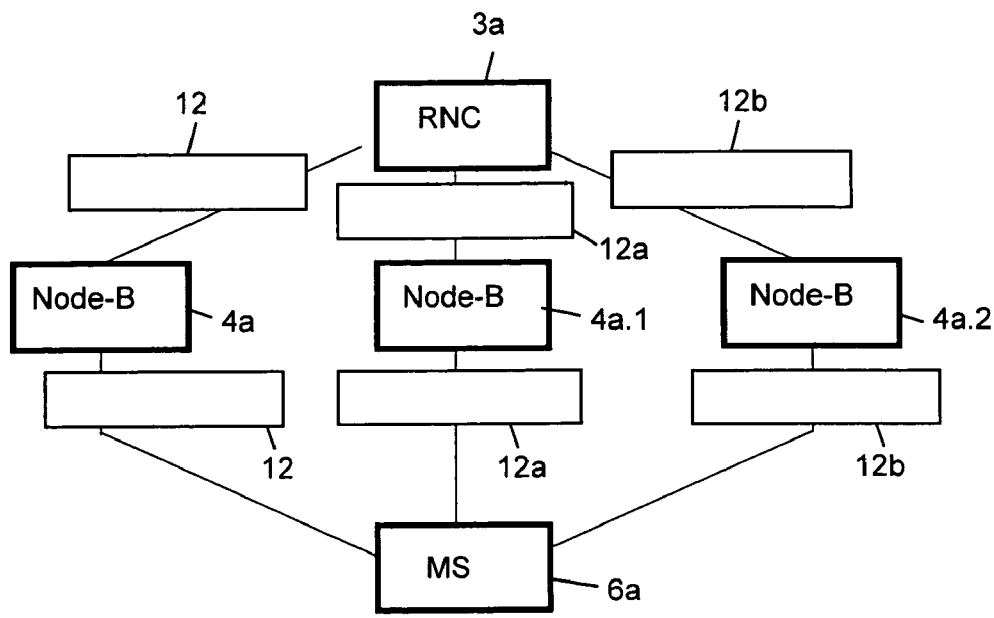

The drawings are:

FIG. 1: An example for a mobile transmission network with connections between two mobile stations without a transcoder and a connection between a mobile station and the public switching telephone network with a transcoder;

FIG. 2: A representation of the transmission of voice information on all segments between mobile stations and between a mobile station and the public switching telephone network;

FIG. 3: An example for a transmission framework with fields for inband-signaling;

FIG. 4: A representation of the transmission of voice information between mobile stations in the initial situation;

FIG. 5: A representation of signaling to change the codec operation mode; and FIG. 6: A representation after modification of the codec operation mode in a segment, i.e. asymmetrical sending and receiving.

The initial assumption is for network architecture as shown in FIG. 1. The CDMA mobile communications network shown in FIG. 1 consists of two segments, namely Radio Access Network (RAN) 1 and the Core Network (CN) 2. RAN 1 includes the node types Radio Network Controller (RNC) 3, also designated as control of the base station, and Node-B 4, also labeled base station. In instances of soft handover, two or more Node-B 4 units are involved in the transmission connection. CN 2 includes the node type U-MSC 5, also labeled U-Mobile Services Switching Center. There is a radio transmission segment or air interface between a mobile station (MS) 6 and RAN 1. CN 2 is connected to the public switching telephone network 8 (ISDN, PSTN). The described embodiment is based on the following assumptions:

A Multi-Mode Codec (MMC) is implemented in all mobile stations 6, i.e. voice coding in various forms with varying coding parameters are possible. Each codec operating form has a specified parameter set in multi-mode codecs. The various potential operating modes of a MMC serve for the adaption of voice coding to the conditions in the radio transmission segment.

A transcoder 7 is in position in CN 1; it serves to convert the respective voice coding between mobile network 1, 2 and the public switching telephone network 8.

The connection 10 between mobile stations does not include a transcoder, i.e. it operates without a voice code conversion in the connection between the two mobile stations 6a, 6b. This requires that the two mobile stations 6a, 6b will always use the same codec operating mode for a connection in a duplex direction.

The method of adaption of codec operating mode according to the invention for the mobile transmission network shown in FIG. 1 is described below; it is based on the following assumptions:

Inband signaling is used in a connection between RNC 3a, 3b or between RNC 3 and transcoder 7, i.e. load and signal information are transmitted on the same channel.

Differing codec operating modes may be used simultaneously in both duplex directions, i.e. the codec operating mode for MS 6a to MS 6b (the first MS transmits, the second MS receives) may differ from the codec operating mode for MS 6b to MS 6a (the second MS transmits, the first MS receives).

Outband signaling is used within RAN 1 to modify the codec operating mode.

RNC 3 decides whether to change codec operating modes.

RNC 3 decides on the physical transmission channel, when the codec operating mode is changed, i.e. RNC 3 determines the parameters of channel coding, the gross bit rate, and the transmission power for the new codec operating mode.

The following discussion assumes that the number of available codec operating modes is N and that the operating mode n+1 is more robust than operating mode n. L represents the maximum number of levels which may be skipped, if the transmission conditions have improved.

The voice data for a certain time period are transmitted in the mobile radio network in the sequential frame 12. According to FIG. 3, each frame 12 corresponds to the source-coded voice signal 13 and a prefix. The time period is described as the frame length and may amount to 20 ms, for example. The prefix consists of two fields 14, 15. The first field 14 is identified as Codec Mode Identification (CMI). CMI specifies which codec operating mode is used for this voice frame 13.

The receiver undertakes a voice decoding according to the operating mode specified in CMI.

The second field 15 is designated as the Better Radio Condition Indication (BRI). BRI is used, when the transmission conditions have improved on the entire transmission route, i.e. on two radio transmission segments in the case of a MS to MS connection 10 and on a single radio transmission segment in the case of a connection between a MS and the public switching telephone network, and thus when a switch may be made to a less robust codec operating mode. If, for example, BRI has the value 0, the transmission conditions have not improved. If the value for BRI is changed to BRI>1, then there has been an improvement in transmission conditions. The higher the value for BRI, the larger the improvement in transmission conditions.

FIG. 2 indicates how the voice information is transmitted on the various segments. It is assumed here for simplification that the connection involves only one Node-B 4 in each case.

The following rules apply to a change of the operating mode:

A change to a more robust operating mode is carried out whenever the transmission conditions deteriorate on one of the two transmission segments.

A change to a less robust operating mode is carried out whenever the transmission conditions improve on both transmission segments.

The following initial conditions prevail prior to a change to a different operating mode:

According to FIG. 4, there is a communication connection between a first MS 6a and a second MS 6b. Mobile stations 6a and 6b send and receive in the same codec operating mode, identified by the frame prefix 14a (CMIa). For the sake of simplicity, it is assumed here as well that only one Node-B is involved in the transmission for each mobile station.

Each of RNC 3a, 3b involved in the communication receives constantly measurement reports from its associated Node-B 6a or 6b involved in the communication. For example, if RNC 3a connected to MS 6a notes that the transmission conditions in the air interface between Node-B 4a and MS 6a are deteriorating, then a change in codec operating modes is necessary.

RNC 3a instructs MS 6a via the signaling channel (outband signaling) to use a different operating mode, such as n+1, and also specifies the time of switch-over. This is done via the signaling channel. The time is specified by means of the frame identification. This identification is exchanged between RNC 3a and MS 6a to assure mutual synchronization.

Because MS 6a needs to synchronize with each of Node-B 4a, 4a.1, 4a.2 involved in the connection, each transmission interface between MS 6a and the respective Node-B 4a, 4a.1, 4a.2 uses different frame identification for frame 12, which contains the same information, as shown in FIG. 5. MS 6a transmits in the new operating mode n+1, noted by the prefix 14b (CMIb), from the specified point in time.

Figure 6:
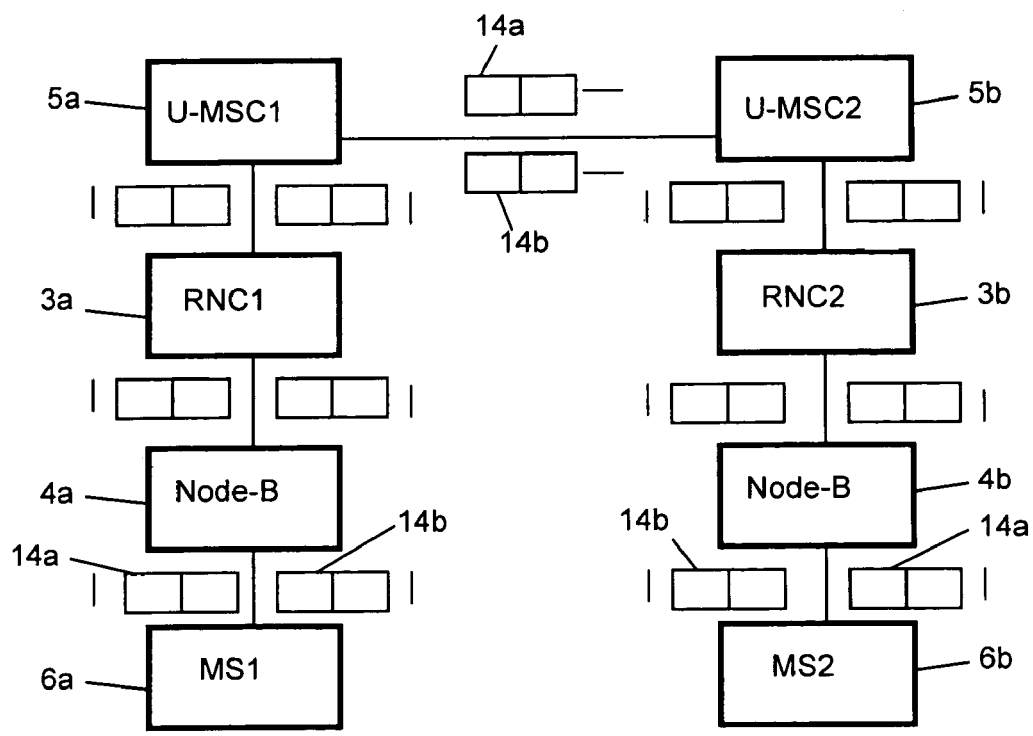

RNC 3a receives voice signals in the modified operating mode n+1 from MS 6a and relays these to RNC 3b. In addition, the new CMI 14b, now corresponding to CMIb, is transmitted or signaled in the load channel, i.e. inband. RNC 3a receives voice signals in unchanged operating mode n, corresponding to CMIa 14a from RNC 3b, as shown in FIG. 6.

RNC 3b receives voice frame 13 in the new operating mode n+1 and determines CMI, in this case CMIb. RNC 3b determines, on the basis of the transmission conditions in its area, the physical channel (transmission channel), the channel coding, the gross bit rate, and the transmission power for the new codec operating mode n+1 and communicates this to all involved Node-B 4b. At the same time, RNC 3b copies the voice frame 12 and transmits it to all involved Node-B 4b. MS 6b receives the voice frame 12 in modified operating mode n+1 and carries out the voice decoding according to CMIb. Node-B 4b (or all Node-Bs) communicates the channel coding to MS 6b for each physical control channel, where MS 6b decodes the channel correspondingly.

MS 6b immediately begins to transmit in the new operating mode as specified by CMIb.

This achieves the target situation, in which MS 6a and MS 6b transmit and receive in the new operating mode n+1.

As long as transmission conditions do not improve in RNC 3a or 3b, all voice frames are set to the value BRI=0. The current codec operating mode stays in effect.

As soon as RNC 3a or 3b note that the transmission conditions have improved and that a change from the current codec operating mode n to n−1 would be possible as far as it is concerned, it communicates this to the associated MS 6a or 6b. MS 6a or 6b then sends a value of BRI>0, such as BRI=1, in its voice frame. However, both transmission segments continue to use the current codec operating mode n.

When RNC 3a or 3b receives a voice frame with BRI=I1>0 and sends a voice frame BRI=I2>0, it initiates a change of the codec operating mode from n to n−I, where I is the lesser value of I1 and I2. Thus, the preferred choice will always be the codec operating mode corresponding to the transmission conditions on the worst segment.

The method of the subsequent modification of the codec operating mode is identical to the algorithm described above.

The adaption of the codec operating mode for a connection between a MS and the public switching telephone network represents a special case of the specified procedure. It involves a change of codec operating mode in RNC 3 on the one hand and in transcoder 7 on the other hand.

In this case, BRI will always have the maximum value L for the voice frame sent by the transcoder, i.e. for the connection in the downlink or the direction terminating in the MS. This means that the codec operating mode used for the connection to the public switching telephone network (via the transcoder) is irrelevant. The codec operating mode is determined solely by the transmission segment to/from the mobile station.

The invention claimed is:

1. A method for adapting the operating mode of a multi-mode codec to changing transmission conditions in a CDMA mobile transmission network, comprising: whichever of two mobile stations (MS1; MS2) encounters a change in the transmission quality on its air interface, which causes it to change its codec operating mode, induces the other mobile station (MS1; MS2) in the case of a transmission between two mobile stations, or a transcoder in the case of a transmission from a mobile station to a public switching telephone network, to likewise change the codec operating mode; and having a radio network controller RNC instruct a mobile station MS via a signaling channel between the radio network controller RNC and the mobile station MS to use a different codec operating mode and to specify the time of change, once the radio network controller RNC has decided to change the codec operating mode.

2. The method according to claim 1, including changing to a more robust codec operating mode whenever the transmission conditions on one side of transmission segments involved in the method deteriorate.

3. The method according to claim 1, including changing to a less robust codec operating mode whenever the transmission conditions on all transmission segments involved in the method improve.

4. The method according to claim 1, including having the decision to change the codec operating mode originate in radio network controllers RNC of the mobile transmission network.

5. The method according to claim 1, including having radio network controllers RNC select a physical transmission channel to be used when there is a change of the codec operating mode.

6. The method according to claim 1, including having base stations Node-Bs inform an associated radio network controller RNC regarding the quality of the connection in an uplink, transferring measurement values as measured by the base station to a mobile station MS using the Node-Bs of the radio network controller in order for the mobile station to decide whether to change the codec operating mode, and wherein the mobile station MS using the Node-Bs of the radio network controller RNC decides on a change of codec operating modes based on measurement values.

7. The method according to claim 1, and using outband signaling between a radio network controller RNC and a mobile station MS associated therewith regarding a change in codec operating mode.

8. The method according to claim 1, including having inband signaling among radio network controllers RNC involved or between a radio network controller RNC and the transcoder to exchange information on the codec operating mode being used.

9. The method according to claim 8, including having the inband signaling use specific fields of a transmission frame, where a first field CMI specifies which codec operating mode is used for the transmission frame and wherein a second field BRI identifies a change in transmission conditions of a relevant transmission segment.

10. The method according to claim 1, including having differing codec operating modes in place simultaneously in a connection with two duplex directions.

11. The method according to claim 1, including having a radio network controller RNC receive transmission frames with voice signals in a new codec operating mode from an associated mobile station MS, and the radio network controller RNC transmitting said transmission frames to other radio network controllers involved in the transmission.

12. A method for adapting the operating mode of a multi-mode codec to changing transmission conditions in a CDMA mobile transmission network, comprising: whichever of two mobile stations (MS1; MS2) encounters a change in the transmission quality on its air interface, which causes it to change its codec operating mode, induces the other mobile station (MS1; MS2) in the case of a transmission between two mobile stations, or a transcoder in the case of a transmission from a mobile station to a public switching telephone network, to likewise change the codec operating mode;

having a radio network controller RNC instruct a mobile station MS via a signaling channel between the radio network controller RNC and the mobile station MS to use a different codec operating mode and to specify the time of change, once the radio network controller RNC has decided to change the codec operating mode; and specifying the time of change by means of frame identification between the radio network controller RNC and the mobile station MS.

13. A method for adapting the operating mode of a multi-mode codec to changing transmission conditions in a CDMA mobile transmission network, comprising: whichever of two mobile stations (MS1; MS2) encounters a change in the transmission quality on its air interface, which causes it to change its codec operating mode, induces the other mobile station (MS1; MS2) in the case of a transmission between two mobile stations, or a transcoder in the case of a transmission from a mobile station to a public switching telephone network, to likewise change the codec operating mode;

having a radio network controller RNC instruct a mobile station MS via a signaling channel between the radio network controller RNC and the mobile station MS to use a different codec operating mode and to specify the time of change, once the radio network controller RNC has decided to change the codec operating mode; and having the mobile station MS transmit in a new operating mode from the specified time of change.

* * * * *